May 29, 1928.
J. A. HEINZ
ARM AND BOTTLE HOLDER
Filed Aug. 8, 1927
1,671,862
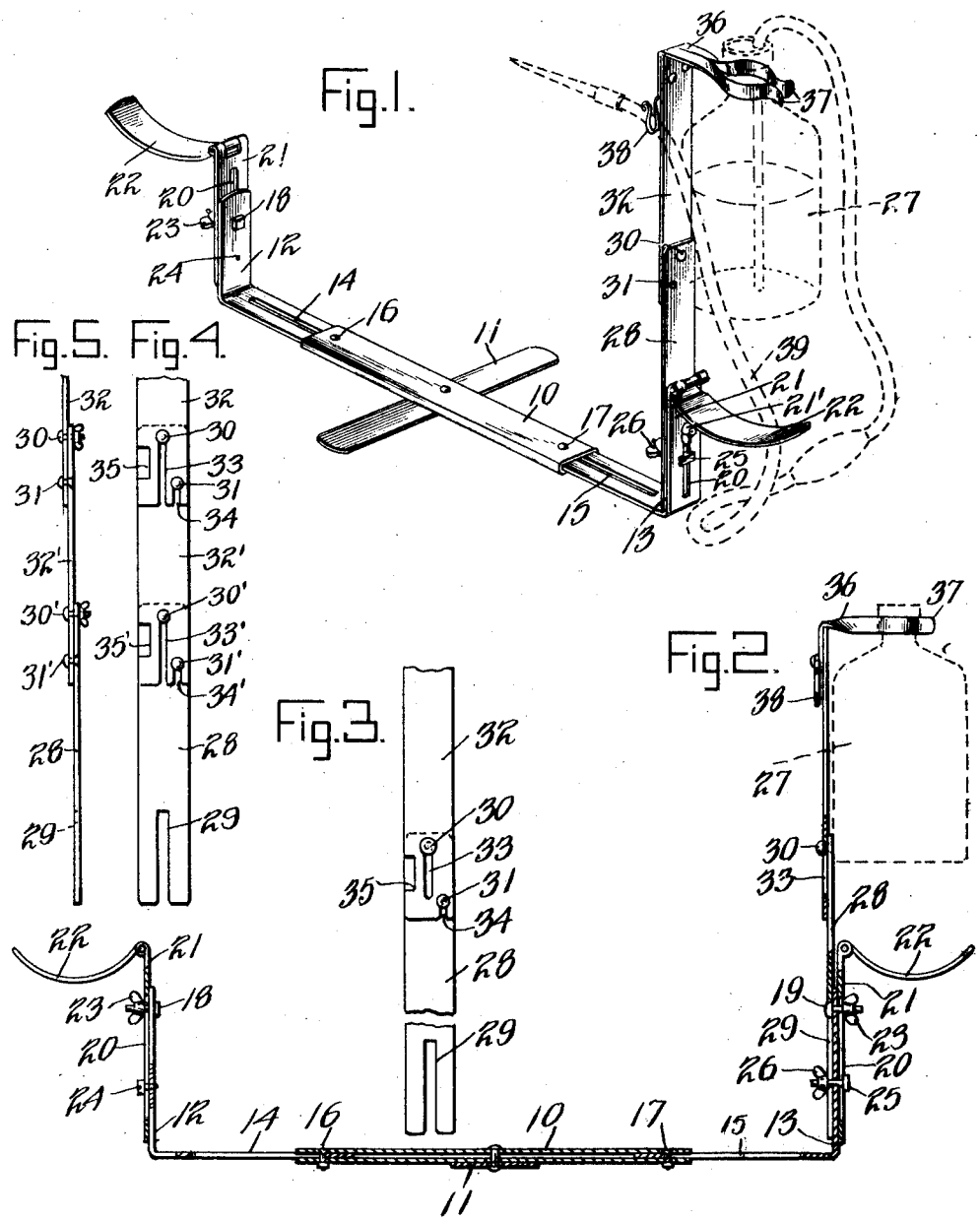
Inventor
Julius A. Heinz
By Patented May 29, 1928.

1,671,862

UNITED STATES PATENT OFFICE.

JULIUS A. HEINZ, OF PESOTUM, ILLINOIS; KATHRYN KERWIN HEINZ AND FRED B. HAMILL EXECUTORS OF SAID JULIUS A. HEINZ, DECEASED.

ARM AND BOTTLE HOLDER.

Application filed August 8, 1927. Serial No. 211,475.

My invention relates to an arm and bottle holder for use by undertakers in embalming dead bodies, and it is an object of the invention to provide a simple and inexpensive device of this character by means of which the arms of the body may be held in elevated position during the drainage of the body and in natural position during the injection of the embalming fluid, and with convenient detachable means for supporting the embalming fluid, all as will be hereinafter more fully described and claimed.

Referring to the accompany drawings which are made a part hereof and on which similar reference characters indicate similar parts, Figure 1 is a perspective illustrating one application of my invention, Figure 2, a central longitudinal section, Figure 3, a detail, and Figures 4 and 5, detail views of the modified form of bottle supporting arm.

In the drawings reference character 10 indicates a base provided with a pivotally connected cross piece 11 by means of which it is prevented from tilting when in use, such cross piece being capable of being collapsed into parallel relation with the base when the device is not in use. A pair of arms 12 and 13 are slidably mounted in the base 10, the horizontal portions of said arms being provided with slots 14 and 15 through which extend bolts 16 and 17 carried by the base 10, said slots and bolts serving to prevent the removal of the arms from the base. Bolts such as 16 and 17 shown are preferable to rivets in order that the device may be taken apart and cleaned and I preferably countersink such bolts as illustrated. The upright portions of the arms are provided with bolts 18 and 19 which extend through slots 20 in vertically adjustable brackets 21 provided with pivotally supported arm rests 22 pivoted to their upper ends. The bolts 18 and 19 are provided with wing nuts 23 by means of which the vertically adjustable brackets 21 are secured in the proper adjusted positions. The upright arm of the bracket 12 is provided with a screw 24 which is disposed in the slot 20 of the bracket 21 by means of which the bracket is prevented from turning on its pivot 18. The upright arm of the bracket 13 is provided with a bolt 25 having a wing nut 26 on its opposite end, said bolt 25 serving to prevent bracket 21 from turning on its pivot 19.

The device, above described, is suitable for supporting the arms of a body upon an embalming board, day-bed, morgue table, or other place where the body can be embalmed and is adjustable to the desired width or height and is of such compactness that it may be easily carried.

By the use of this device, the tying of the hands and arms over the body to hold them in position during and after embalming is unnecessary and by its use the blood in the veins and arteries may be thoroughly drained and all discolorations cleared from the fingertips back to the body. The arms are also held out of the way of the operator. This device may also be used for supporting the arms until the body is placed in a coffin.

A bracket is provided for supporting a bottle 27 of embalming fluid, said bracket comprising a lower member 28 and an upper member 32, the member 28 having a bifurcation 29 in its lower end adapted to receive the head of the bolt 19 and the body of the bolt 25, the wing screw 26 being adapted to be tightened for clamping the bracket in position, the spaced bolts preventing the turning of the bracket. Studs 30 and 31 are mounted in offset relation in the upper end of the lower member 28 and serve to connect the upper member 32 of the bracket to the lower member, said upper member being provided with slots 33 and 34 and a recess 35, the slot 33 serving to house the stud 30 and the slot 34 serving to house the stud 31 when the sections of the bracket are in supporting position.

When it is desired to collapse the upper and lower sections of the bracket upon each other, they may be pulled longitudinally until the stud 30 reaches the opposite end of the slot 33 from its position in Fig. 3, whereupon the sections of the bracket may be folded together until the stud 31 enters the recess 35.

In lieu of the bottle supporting bracket shown in Figs. 1 to 3, a modified form of bracket may be used including one or more additional sections 32' provided with an upper end similar to the upper end of the section 28 and a bottom similar to the bottom of the member 32 but with a slot 33' extending entirely to the end of the member 32 instead of merely the short slot 33. In order to clamp the members together, a bolt 30' and wing screw may be substituted for the stud 30. By the addition of one or more members of this character a supporting arm or bracket would fold into a plurality of collapsed sections which can be used to raise the bottle or container of embalming fluid to the desired height to give the desired result.

On the upper end of the upper section 32 of the bracket is mounted a member 36 having a pair of spring fingers 37 which are oppositely curved for engagement about the neck of the bottle 27. Also adjacent the upper end of the bracket is provided a spring wire hook 38 for holding the tubing 39 which extends into the bottle 27 which contains the embalming fluid and keeps such fluid from running out while the bottle is being refilled or the like. The spring wire hook 38 may be placed in any other position and may be formed in any other desired shape.

A bottle holder is therefore provided which is made to fold by means of a collapsible hinge and is readily attachable to or detachable from the arm holder by the operation of the thumb screw. The bottle is held in position out of the way of the operator by means of which embarrassing accidents during the operation are avoided. It is also held so that the flow of the fluid may be readily observed and at a higher point than the point of injection, thus permitting the fluid to gravitate into the body which results in good cosmetic effect and renders the body life-like in appearance.

When not in use the cross piece 11 may be turned lengthwise of the base 10 and the arms 12 and 13 slid into the base to the fullest extent. Likewise the brackets 21 may be lowered and the arm rests 22 folded over on the inside of the brackets and in substantially parallel relation thereto. The bottle supporting bracket when detached and folded together may be placed within the arms 12 and 13, thus providing a very neat and compact package.

It will be obvious to those skilled in the art that various changes may be made in my device without departing from the spirit of my invention, and, therefore, do not limit myself to what is shown in the drawings and described in the specification, but only as set forth in the appended claims.

Having thus fully described my said invention, what I claim as new and desire to secure by Letters Patent, is:

1. An arm and bottle holder comprising a base, brackets adjustable on the base toward and from each other, and vertically adjustable arm supporting members carried by said brackets, substantially as set forth.

2. An arm and bottle holder comprising a base, brackets adjustable on the base toward and from each other, vertically adjustable arm supporting members carried by said brackets, and means for preventing overturning of said base, substantially as set forth.

3. An arm and bottle holder comprising a base, brackets adjustable on the base toward and from each other, vertically adjustable arm supporting members carried by said brackets, means for preventing overturning of said base, and means on said base for supporting a bottle, substantially as set forth.

4. An arm and bottle holder comprising a base, brackets adjustable on the base toward and from each other, vertically adjustable arm supporting members carried by said brackets, means for preventing overturning of said base, and means detachably connected to one of said brackets for supporting a bottle, substantially as set forth.

5. The combination of a base, a member pivoted to said base and movable to a crosswise position for preventing overturning of the base, adjustable members slidable on said base toward and from each other and having upright portions, and outwardly extending means carried by said upright portions for supporting the arms of a human body, substantially as set forth.

6. The combination of a base, adjustable members slidable on said base toward and from each other and having upright portions, and outwardly extending means carried by said upright portions for supporting the arms of a human body, substantially as set forth.

7. The combination of a base, a member pivoted to said base and movable to a crosswise position for preventing overturning of the base, adjustable members slidable on said base toward and from each other and having upright portions, outwardly extending means carried by said upright portions for supporting the arms of a human body, and means on said base for supporting a bottle, substantially as set forth.

8. The combination of a base, a member pivoted to said base and movable to a crosswise position for preventing overturning of the base, adjustable members slidable longitudinally of said base and having upright portions, outwardly extending means carried by said upright portions for supporting the arms of a human body, and a detachable collapsible bottle holder for connection with one of said upright portions, substantially as set forth.

9. A device of the class described comprising a base, brackets slidable into said base, and outwardly extending arm supporting members carried by said brackets, substantially as set forth.

10. A device of the class described comprising a base, brackets slidable into said base, foldable outwardly extending arm supporting members carried by said brackets, and an upright detachably connected to one of said brackets and having means at its upper end for engaging and supporting a bottle, substantially as set forth.

In witness whereof, I have hereunto set my hand at Pesotum, Illinois, this 30th day of July, A. D. nineteen hundred and twenty-seven.

JULIUS A. HEINZ.